US011341336B2

(12) United States Patent
Narukawa et al.

(10) Patent No.: US 11,341,336 B2
(45) Date of Patent: May 24, 2022

(54) RECORDING MEDIUM, CONVERSATION CONTROL METHOD, AND INFORMATION PROCESSING APPARATUS

(71) Applicant: FUJITSU LIMITED, Kawasaki (JP)

(72) Inventors: Shinji Narukawa, Ohta (JP); Hiroshi Matsuyama, Ota (JP)

(73) Assignee: FUJITSU LIMIITED, Kawasaki (JP)

( * ) Notice: Subject to any disclaimer, the term of this patent is extended or adjusted under 35 U.S.C. 154(b) by 59 days.

(21) Appl. No.: 17/101,391

(22) Filed: Nov. 23, 2020

(65) Prior Publication Data

US 2021/0073475 A1    Mar. 11, 2021

Related U.S. Application Data

(63) Continuation of application No. PCT/JP2019/021782, filed on May 31, 2019.

(51) Int. Cl.
*G06F 40/35* (2020.01)
*G06F 3/0482* (2013.01)
*H04L 51/02* (2022.01)

(52) U.S. Cl.
CPC ............ *G06F 40/35* (2020.01); *G06F 3/0482* (2013.01); *H04L 51/02* (2013.01)

(58) Field of Classification Search
CPC ......... G06F 3/0482; G06F 40/35; H04L 51/02
See application file for complete search history.

(56) References Cited

U.S. PATENT DOCUMENTS

2010/0093319 A1*  4/2010  Sherman ........... H04M 3/42178
                                                455/414.1
2012/0079606 A1*  3/2012  Evans ................. G06Q 30/04
                                                726/28

(Continued)

FOREIGN PATENT DOCUMENTS

JP       2018-128747 A       8/2018
JP       2019-12506 A        1/2019

(Continued)

OTHER PUBLICATIONS

International Search Report and Written Opinion dated Jul. 9, 2019, issued in counterpart application No. PCT/JP2019/021782 with Partial English translation (10 pages).

*Primary Examiner* — Seth A Silverman
(74) *Attorney, Agent, or Firm* — WHDA, LLP

(57) ABSTRACT

A computer-readable recording medium stores therein a program for causing a computer to execute a process including: receiving, from an information processing terminal of a user, a start instruction for a conversation with a chatbot and attribute information of the user, obtained by the terminal; obtaining type information of the terminal; referring to a storage storing therein, for each user attribute, script information defining a process related to the conversation, determining, based on the attribute information, the script information to be used, and using the determined script information to start the conversation by the chatbot via the terminal, in response to the start instruction, when the type information corresponds to a specified information processing terminal; and displaying, by the terminal, information enabling selection of the script information, when the type information does not correspond to the specified information processing terminal, and using selected script information to start the conversation.

7 Claims, 13 Drawing Sheets

(56) References Cited

U.S. PATENT DOCUMENTS

| | | | |
|---|---|---|---|
| 2018/0233132 A1* | 8/2018 | Herold | G06K 9/00 |
| 2018/0234367 A1* | 8/2018 | Lange | G06F 3/0483 |
| 2019/0215283 A1* | 7/2019 | Nahum | G06F 3/0482 |

FOREIGN PATENT DOCUMENTS

| | | |
|---|---|---|
| JP | 2019-28646 A | 2/2019 |
| WO | 2018/143440 A1 | 8/2018 |

* cited by examiner

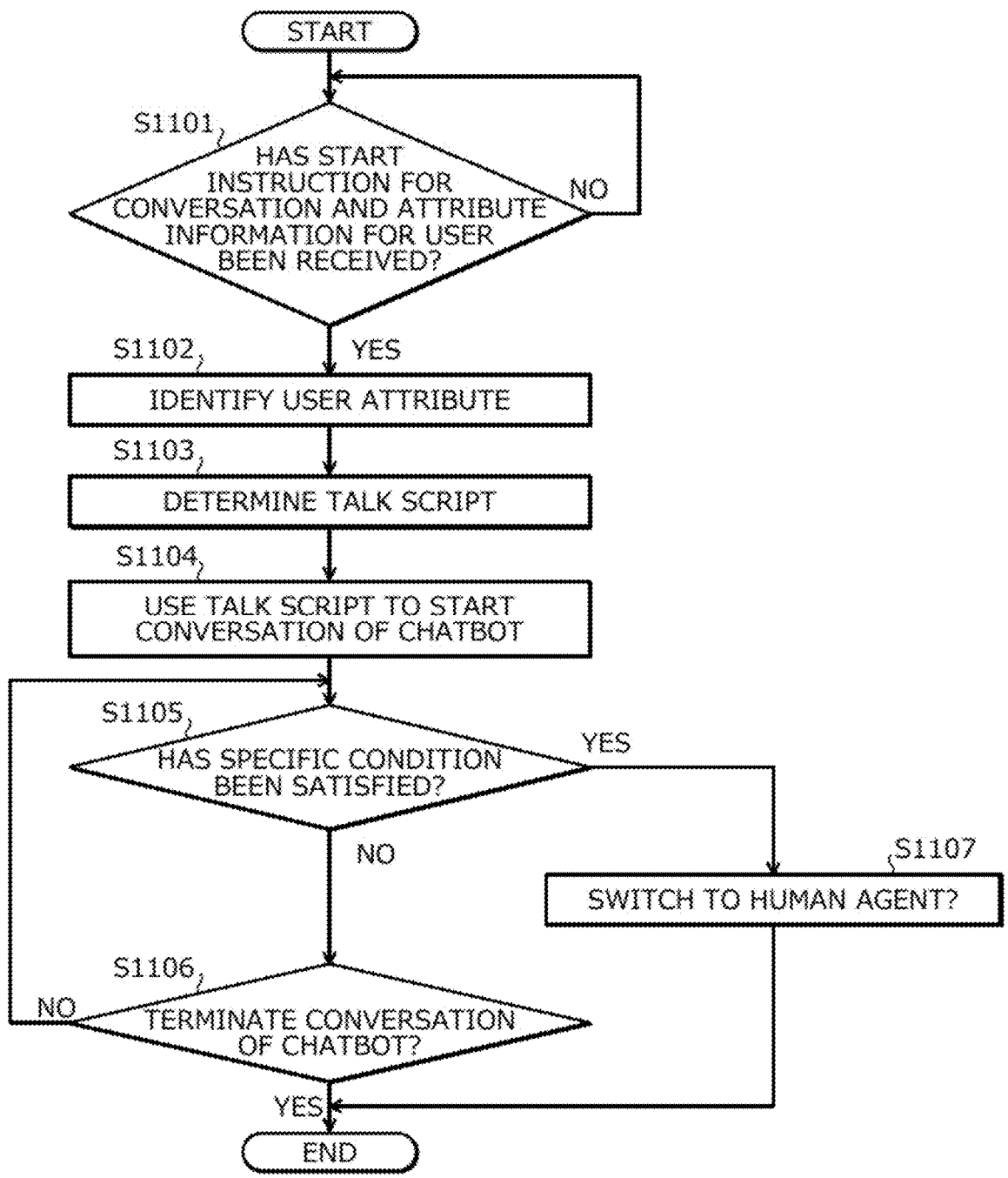

RECORDING MEDIUM, CONVERSATION CONTROL METHOD, AND INFORMATION PROCESSING APPARATUS

CROSS REFERENCE TO RELATED APPLICATIONS

This application is a continuation application of International Application PCT/JP2019/021782, filed on May 31, 2019 and designating the U.S., the entire contents of which are incorporated herein by reference.

FIELD

The embodiments discussed herein relate to recording medium, a conversation control method, and an information processing apparatus.

BACKGROUND

Recently, digital boards capable of bilateral communication coordinated with a chatbot have begun to be used. For example, digital boards are used to provide shop or facility information. Further, digital boards are expected to be installed in highly public places such as in cities, governmental offices, transit stations, etc. for use by an indefinitely large number of people.

As a prior art, there is an artificial intelligence conversation method of extracting emotion information of a user from information collected in state of inactivity of a conversation function and using the emotion information as a conversation activation trigger to activate the conversation function. The emotion information of the user, for example, is judged comprehensively by first emotion information extracted from a verbally input sentence of the user and second emotion information extracted from a facial expression based on a video of a face of the user. For example, refer to Japanese Laid-Open Patent Publication No. 2019-12506.

SUMMARY

According to an aspect of an embodiment, a computer-readable recording medium has stored therein a program for causing a computer to execute a process, the process including receiving, from an information processing terminal used by a user, a start instruction for a conversation with a chatbot and receiving attribute information of the user, obtained by the information processing terminal; obtaining type information of the information processing terminal; referring to a storage storing therein, for each user attribute of a plurality of user attributes, script information that defines a process related to the conversation of the chatbot, determining, based on the received attribute information of the user, the script information to be used, and using the determined script information to start the conversation performed by the chatbot via the information processing terminal, in response to the start instruction for the conversation with the chatbot, when the obtained type information corresponds to that of a specified information processing terminal; and displaying, by the information processing terminal, information enabling selection of the script information, when the type information does not correspond to the specified information processing terminal, and using selected script information to start the conversation performed by the chatbot via the information processing terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a flowchart of an example of a procedure of a conversation control process of the information processing apparatus 101.

DESCRIPTION OF THE INVENTION

First, problems related to the conventional techniques are discussed. With the conventional techniques, a problem arises in that a user of a digital board or the like configured to perform bidirectional communication coordinated by a chatbot may withdraw from a chat when it is troublesome to obtain a desired answer.

Embodiments of a conversation control program, a conversation control method, and an information processing apparatus are discussed in detail with reference to the accompanying drawings.

Figure 1:
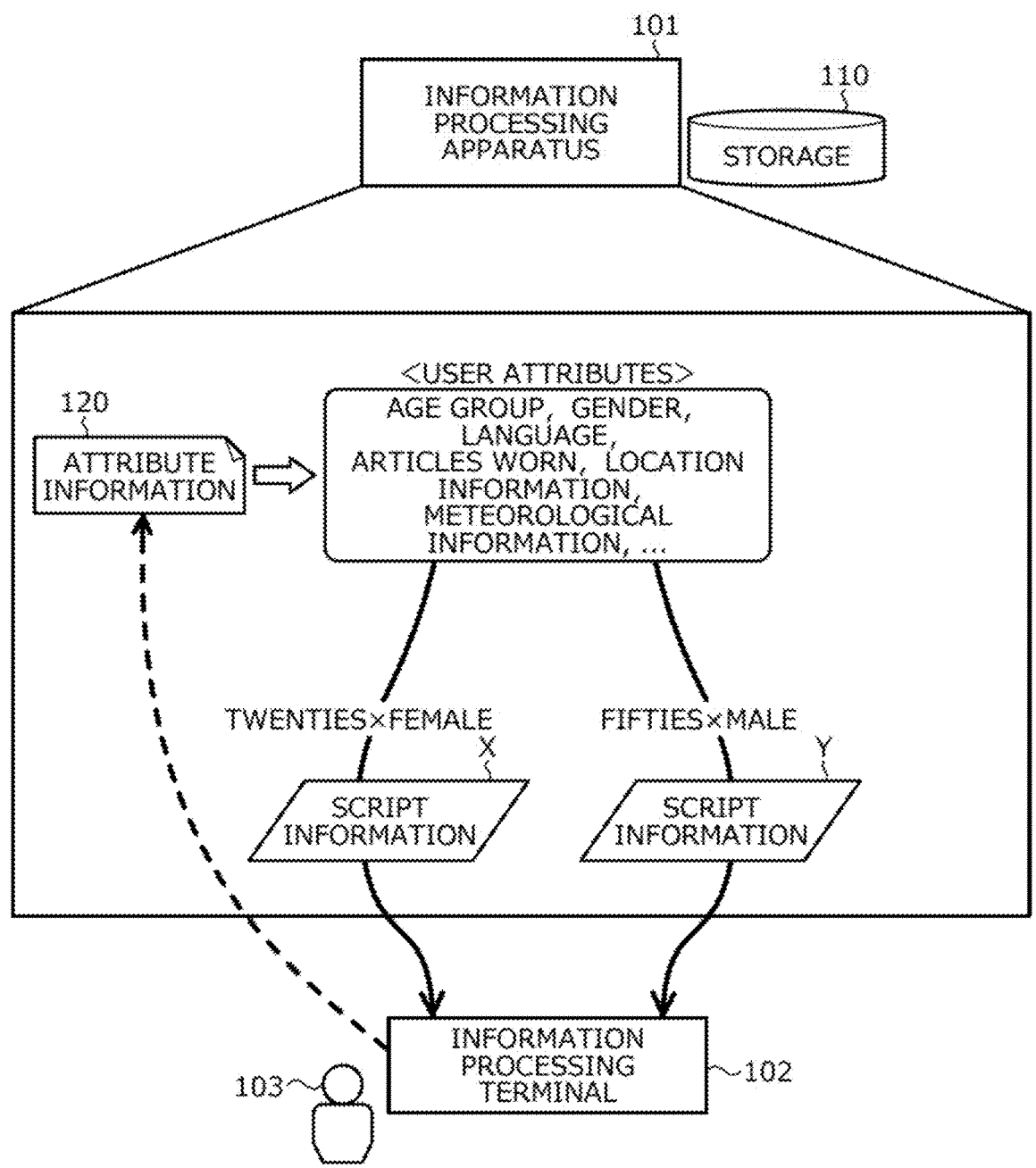
FIG. 1 is a diagram of one example of a conversation control method according to an embodiment.

FIG. 1 is a diagram of one example of a conversation control method according to an embodiment. In FIG. 1, an information processing apparatus 101 is a computer that controls a conversation of a chatbot. The chatbot is a computer that uses artificial intelligence to interact and exchange messages with humans.

An information processing terminal 102 is a computer used when a user converses with the chatbot. For example, the information processing terminal 102 is installed at a highly public place and is used in providing information about shops and services. At the information processing terminal 102, for example, the user may search for a desired answer while interacting with the chatbot by inputting messages, selecting an option, etc.

The answer, for example, is a frequently asked question (FAQ). A FAQ means a "question that is asked frequently" and is a combination of an expected question and an answer for the question.

Here, to enable automated response to various demands from the user by the chatbot, options become complicated and hierarchy becomes deep. The hierarchy becoming deep is an increase in the number of times the user has to select an option. For example, for automated response of an answer having about 1000 patterns by chatbot, the hierarchy has three-levels.

Nonetheless, when the hierarchy becomes deep and the number of options displayed together is increased, etc., obtaining a desired answer is troublesome and the user may withdraw from (withdraw during) the chat. When withdraw from chats increases, for example, opportunities for providing information about shops and services are lost and business opportunities may be missed. On the other hand, when the hierarchy and the number of options displayed together are reduced, the number of answers that may be provided through automated response by the chatbot decreases, whereby meeting user demands becomes difficult.

Thus, in the present embodiment, a conversation control method that attempts to prevent withdraw from a chat by dynamically changing a script according to user attributes to obtain a desired answer quickly is described; the script defines the flow of a conversation of the chatbot, performed via the information processing terminal 102. Here, an example of processes by the information processing apparatus 101 is described.

(1) The information processing apparatus 101 receives a start instruction for a conversation with the chatbot, from the information processing terminal 102 that is used by the user; the information processing apparatus 101 further receives attribute information of the user, obtained by the information processing terminal 102. Here, the start instruction for a conversation with the chatbot is for starting a conversation between the user and the chatbot. The attribute information of the user is information representing characteristics of the user and, for example, is information representing the age and/or gender of the user, a language used by the user, etc.

Further, the attribute information of the user may be information that represents articles worn such as clothing and glasses. Further, attribute information of the user may be information representing whether a companion is present. Further, the attribute information of the user may be location information representing the current location of the user, or meteorological information (temperature, humidity, weather, etc.) for the current location of the user.

In the example in FIG. 1, an instance is assumed in which a start instruction for a conversation with the chatbot and attribute information 120 of a user 103 is received from the information processing terminal 102.

(2) The information processing apparatus 101, in response to the start instruction for a conversation with the chatbot, refers to a storage 110, uses script information determined based on the received attribute information of the user, and starts a conversation performed by the chatbot via the information processing terminal 102. Here, the storage 110 stores therein script information for each of multiple user attributes.

The script information is information (a scenario) that defines a process related to the conversation of the chatbot. In particular, for example, a script is information that defines a talk process of a chat. The talk process is a process for realizing operation (behavior) of the chatbot and, for example, includes a process of speaking, a process of displaying options, etc.

Here, frequently selected FAQs vary according to differences in age group (generation), gender, etc. For example, there is a tendency for women in their twenties to forties to select FAQs related to parenting as compared to men and women of other age groups. There is a tendency for men in their forties and fifties to select FAQs related to care for parents as compared to men and women of other age groups.

Further, frequently selected FAQs also tend to vary according to differences in articles worn. For example, there is a tendency for people wearing glasses to select FAQs related to contact lenses as compared to people who do not wear glasses. Further, frequently selected FAQs also tend to vary according to differences in language. For example, there is a tendency for people who speak a language other than Japanese (for example, foreign visitors) to select FAQs related to shops offering support in multiple languages as compared to people who speak Japanese.

Further, frequently selected FAQs tend to vary according to differences in location or weather. For example, in Akihabara, FAQs related to consumer electronics retailers and electronics stores tend to be selected more often as compared to in other locations. On a rainy day, FAQs related to indoor facilities such as movie theaters tend to be selected as compared to on a sunny day.

Further, frequently selected FAQs tend to vary according to whether a companion is present. For example, there is a tendency for people accompanied by a child to select FAQs related to restaurants that accommodate children. Further, there is a tendency for people with a companion of the opposite sex (for example, a couple) to select FAQs related to date spots as compared to people without a companion.

Therefore, the information processing apparatus 101 sets combinations of age group, gender, language, articles worn, location information, meteorological information, presence/absence of a companion, etc. as user attributes and for each of the user attributes, prepares script information corresponding thereto in advance. For example, the storage 110 stores therein script information X corresponding to a user attribute "twenties×female" and script information Y corresponding to a user attribute "fifties×male".

The information processing apparatus 101 refers to the storage 110 and according to the user attribute identified from the received attribute information of the user, determines script information to be applied to a conversation of the chatbot. Further, the information processing apparatus 101 uses the determined script information and starts a conversation performed by the chatbot via the information processing terminal 102.

In the example in FIG. 1, the user attribute "twenties× female" is assumed to be identified from the attribute information 120. In this instance, the information processing apparatus 101 refers to the storage 110 and uses the script information X that corresponds to the user attribute "twenties×female" to start a conversation performed by the chatbot via the information processing terminal 102.

Further, the user attribute "fifties×male" is assumed to be identified from the attribute information 120. In this instance, the information processing apparatus 101 refers to the storage 110 and uses the script information Y that corresponds to the user attribute "fifties×male" to start a conversation performed by the chatbot via the information processing terminal 102.

In this manner, the flow of the conversation performed by the chatbot via the information processing terminal 102 may be dynamically varied by the information processing apparatus 101, according to characteristics (for example, age group, gender, language, articles worn, presence/absence of a companion, location information, meteorological information, etc.) of the user using the information processing terminal 102. In other words, options facilitating selection by the user may be narrowed down in advance according to characteristics of the user. Therefore, the number of options displayed together may be suppressed and the hierarchy of the script may be reduced, enabling reduction of the burden placed on the user in obtaining a desired answer (FAQ) and suppression of withdrawal from the chat.

An example of a system configuration of a conversation control system 200 that includes the information processing apparatus 101 depicted in FIG. 1 is described. The conversation control system 200, for example, is applied to a FAQ system that utilizes a chatbot.

Figure 2:
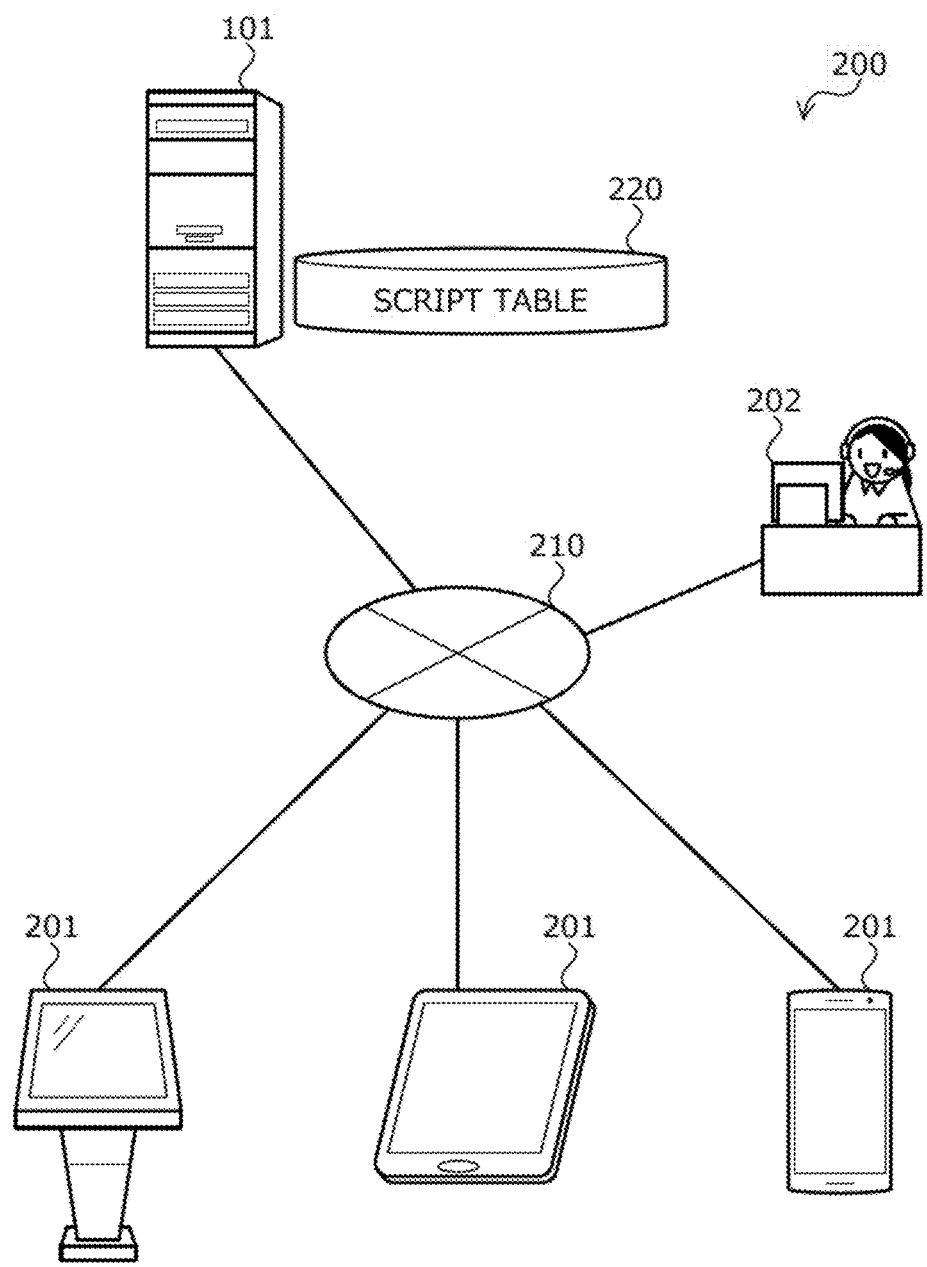
FIG. 2 is a diagram depicting an example of a system configuration of a conversation control system 200.

FIG. 2 is a diagram depicting an example of a system configuration of the conversation control system 200. In FIG. 2, the conversation control system 200 includes the information processing apparatus 101, multiple information processing terminals 201 (three (3) in the example in FIG. 2), and an operator terminal 202. In the conversation control system 200, the information processing apparatus 101, the information processing terminals 201, and the operator terminal 202 are connected through a network 210 that is wired or wireless. The network 210, for example, is a local area network (LAN), a wide area network (WAN), the Internet, etc.

Here, the information processing apparatus 101 has a script table 220 and controls conversations of the chatbot at the information processing terminals 201. For example, the information processing apparatus 101 is a server. Stored contents of the script table 220 are described hereinafter using FIG. 5.

The information processing terminals 201 are each a computer used by a user of the conversation control system 200. The information processing terminals 201 are used when a conversation with the chatbot is to be performed and the information processing terminals 201 interact with the user through the chatbot under the control of the information processing apparatus 101.

For example, the information processing terminals 201 may be digital boards installed in a public place or may be a smartphone or tablet-type personal computer (PC), etc. of an individual. The information processing terminal 102 depicted in FIG. 1, for example, corresponds to the information processing terminals 201.

The operator terminal 202 is a computer used by an operator. The operator is a person who responds to a user when a conversation is to be switched from chatbot-support to human-support. For example, the operator may use a telephone function of the operator terminal 202 to speak directly with a user. For example, the operator terminal 202 is a PC or a tablet PC.

Here, while the information processing apparatus 101 and the information processing terminals 201 are provided separately, configuration is not limited hereto. For example, the information processing apparatus 101 may be realized by the information processing terminals 201.

An example of hardware configuration of the information processing apparatus 101 is described.

Figure 3:
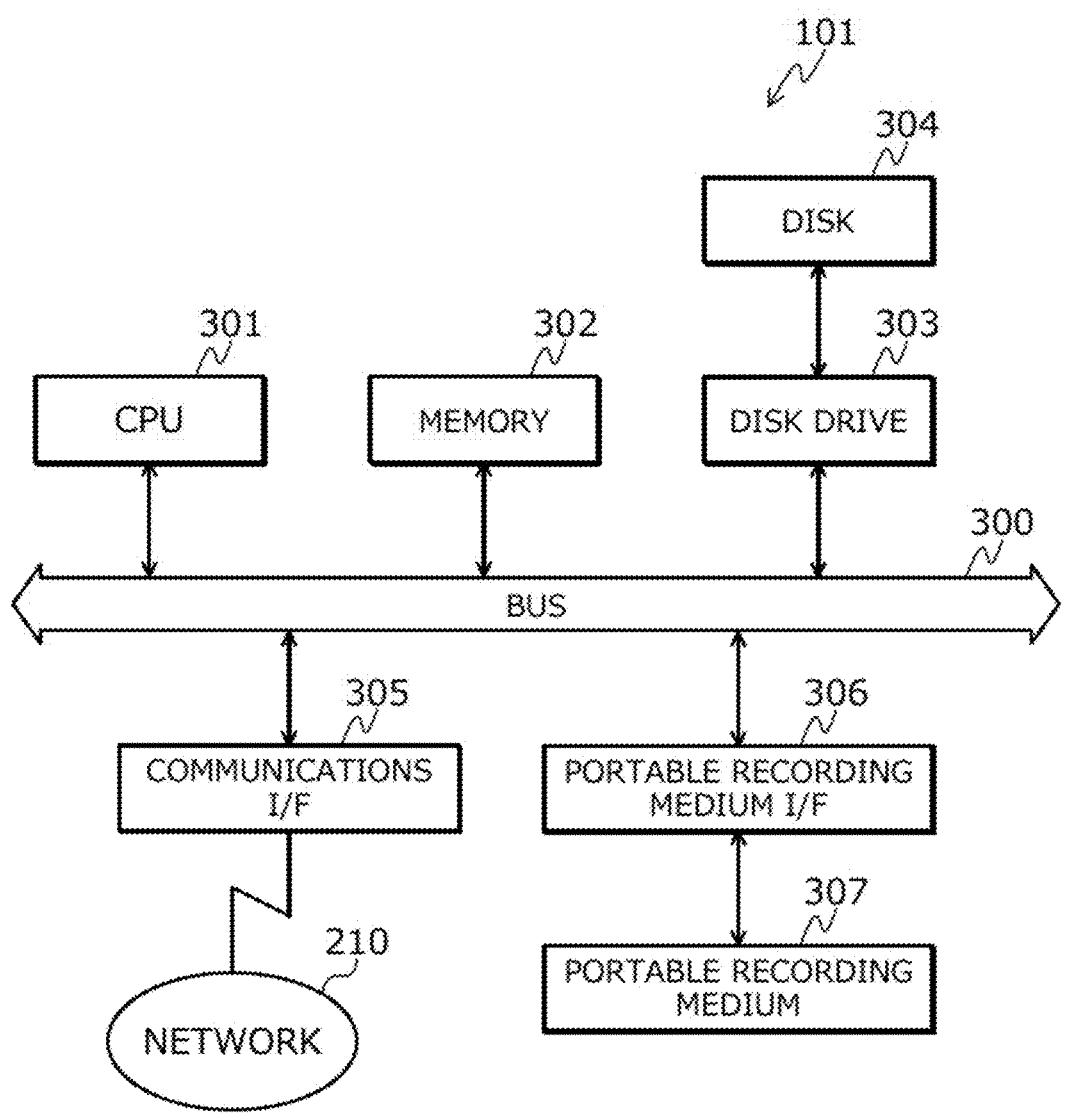
FIG. 3 is a block diagram of an example of a hardware configuration of an information processing apparatus 101.

FIG. 3 is a block diagram of an example of a hardware configuration of the information processing apparatus 101. In FIG. 3, the information processing apparatus 101 has a central processing unit (CPU) 301, a memory 302, a disk drive 303, a disk 304, a communications interface (I/F) 305, a portable recording medium I/F 306, and a portable recording medium 307. Further, these components are connected to one another by a bus 300.

Here, the CPU 301 governs overall control of the information processing apparatus 101. The CPU 301 may have multiple cores. The memory 302, for example, includes a read only memory (ROM), a random access memory (RAM), and a flash ROM, etc. In particular, for example, the flash ROM stores therein programs such as an operating system (OS), the ROM stores therein application programs, and the RAM is used as a work area of the CPU 301. Programs stored in the memory 302 are loaded onto the CPU 301, whereby encoded processes are executed by the CPU 301.

The disk drive 303, under the control of the CPU 301, controls the reading and writing of data with respect to the disk 304. The disk 304 stores therein data written thereto under the control of the disk drive 303. The disk 304, for example, may be a magnetic disk, an optical disk, etc.

The communications I/F 305 is connected to the network 210 through a communications line and is connected to an external computer (for example, the information processing terminals 201 and the operator terminal 202 depicted in FIG. 2) through the network 210. Further, the communications I/F 305 administers an internal interface with the network 210 and controls the input and output of data from an external computer. As the communications I/F 305, for example, a modem, a LAN adapter, etc. may be adopted.

The portable recording medium I/F 306, under the control of the CPU 301, controls the reading and writing of data with respect to the portable recording medium 307. The portable recording medium 307 stores therein data written thereto under the control of the portable recording medium I/F 306. The portable recording medium 307, for example, is a compact disc (CD)-ROM, a digital versatile disk (DVD), a universal serial bus (USB) memory, etc.

The information processing apparatus 101, for example, may have a solid state drive (SSD), an input apparatus, a display, etc. in addition to the components described above. Further, of the components described above, the information processing apparatus 101, for example, may omit the disk drive 303, the disk 304, the portable recording medium I/F 306, and/or the portable recording medium 307.

An example of a hardware configuration of the information processing terminals 201 is described.

Figure 4:
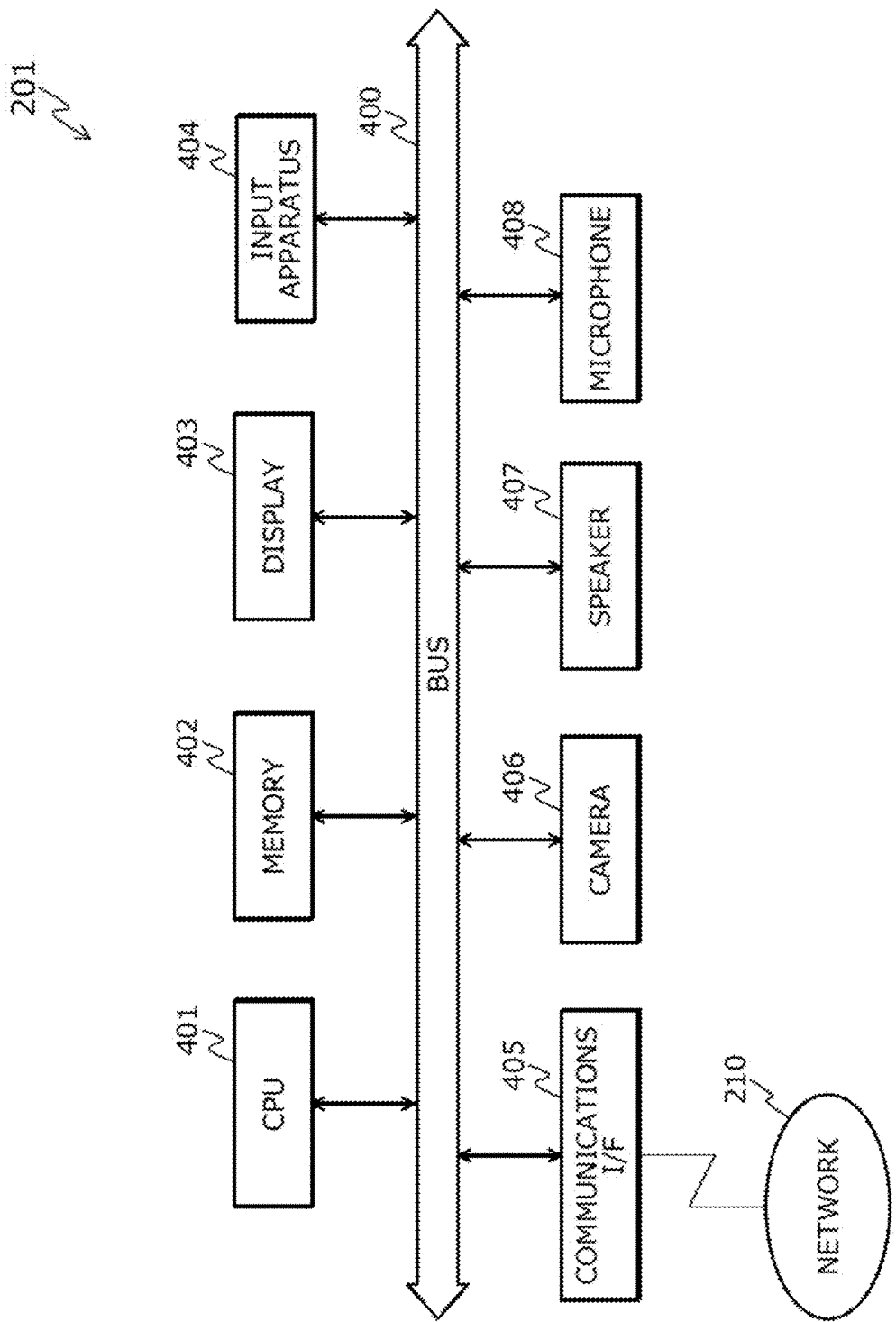
FIG. 4 is a block diagram of an example of a hardware configuration of information processing terminals 201.

FIG. 4 is a block diagram of an example of a hardware configuration of the information processing terminals 201. In FIG. 4, the information processing terminals 201 each has a CPU 401, a memory 402, a display 403, an input apparatus 404, a communications I/F 405, a camera 406, a speaker 407, and a microphone 408. Further, these components are connected to one another by a bus 400.

Here, the CPU 401 governs overall control of the information processing terminals 201. The CPU 401 may have multiple cores. The memory 402, for example, is a storage having a ROM, a RAM, and a flash ROM. In particular, for example, the flash ROM and the ROM store therein various types of programs and the RAM is used as a work area of the CPU 401. Programs stored in the memory 402 are loaded onto the CPU 401, whereby encoded processes are executed by the CPU 401.

The display 403 is a display apparatus that displays a cursor, icons, or a toolbox in addition to documents, images, functional information, etc. As the display 403, for example, a liquid crystal display, an organic electroluminescence (EL) display, etc. may be adopted.

The input apparatus 404 has keys for inputting text, numerals, various types of instructions, etc., and inputs data. The input apparatus 404 may be a touch panel type input pad, a numeric keypad, a keyboard, a mouse, etc.

The communications I/F 405 is connected to the network 210 through a communications line and is connected to an external computer (for example, the information processing apparatus 101, the operator terminal 202) through the network 210. Further, the communications I/F 405 administers an internal interface with the network 210 and controls the input and output of data from an external apparatus.

The camera 406 is a photographing apparatus that captures images (still pictures or video) and outputs image data. The camera 406, for example, is provided at a position enabling photographing of a person looking at the display 403, a companion thereof, etc. The speaker 407 converts an electrical signal into sound and outputs sound. The microphone 408 receives sounds and converts the sounds into an electrical signal.

The information processing terminals 201 may have, for example, a hard disk drive (HDD), a SSD, a near field communications I/F, a portable recording medium I/F, a Global Positioning System (GPS) unit, etc. in addition to the components described above. Further, the operator terminal 202 depicted in FIG. 2 may also be realized by a hardware configuration similar to that of the information processing terminals 201

Stored contents of the script table 220 of the information processing apparatus 101 are described. The script table 220, for example, is realized by a storage apparatus such as the memory 302, the disk 304 depicted in FIG. 3.

Figure 5:
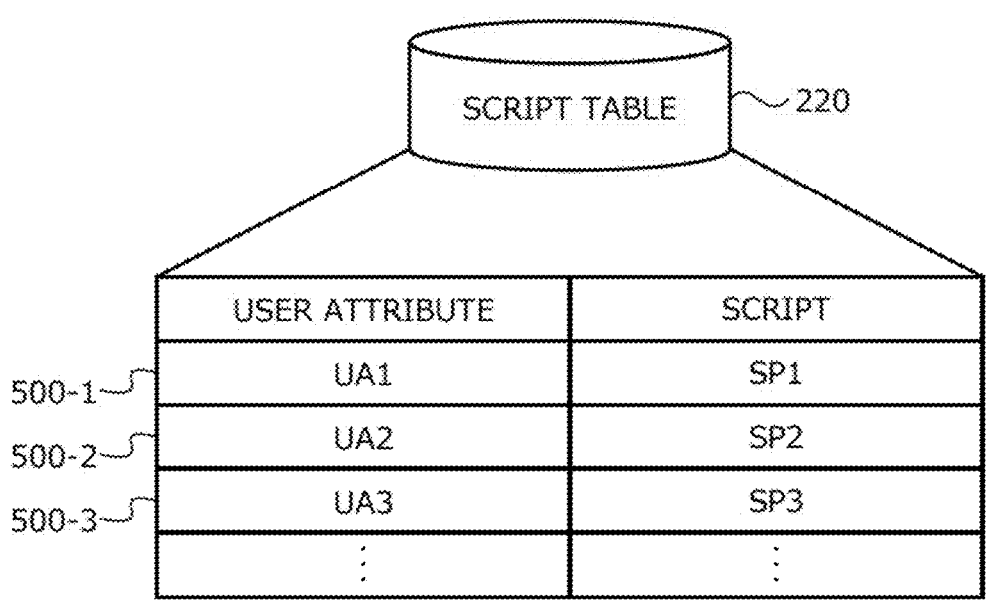
FIG. 5 is a diagram of an example of stored contents of a script table 220.

FIG. 5 is a diagram of an example of stored contents of the script table 220. In FIG. 5, the script table 220 has fields for user attributes and scripts, and by setting information into the fields, script management information (for example, script management information 500-1 to 500-3) is stored as records.

Here, user attributes represent characteristics of users and, for example, are classifications that are combinations of age, gender, language, clothing (article worn), location information, meteorological information, etc. User attributes may be, for example, "twenties×female", "thirties×male", "twenties×female×with children", "twenties×female×language (English)", "twenties×female×couple", "twenties×female× weather (rain)", "twenties×female×temperature (at least 25 degrees C.)", "twenties×male×location (Akihabara)", "twenties×articles worn (glasses)", etc. User attributes, for example, may be set as "ALL" to target all users.

A script is script information (scenario) defining the flow of the conversation performed by the chatbot and is prepared associated with the user attributes. However, in FIG. 5, only script IDs (for example, SP1, SP2, SP3, . . . ) identifying the script information are depicted. For example, the script management information 500-1 indicates that script information SP1 corresponds to a user attribute UA1.

A specific example of the script information defining a flow of a conversation performed by the chatbot is described. Here, the script information SP1 that corresponds to the user attribute UA1 is described as an example.

Figure 6:
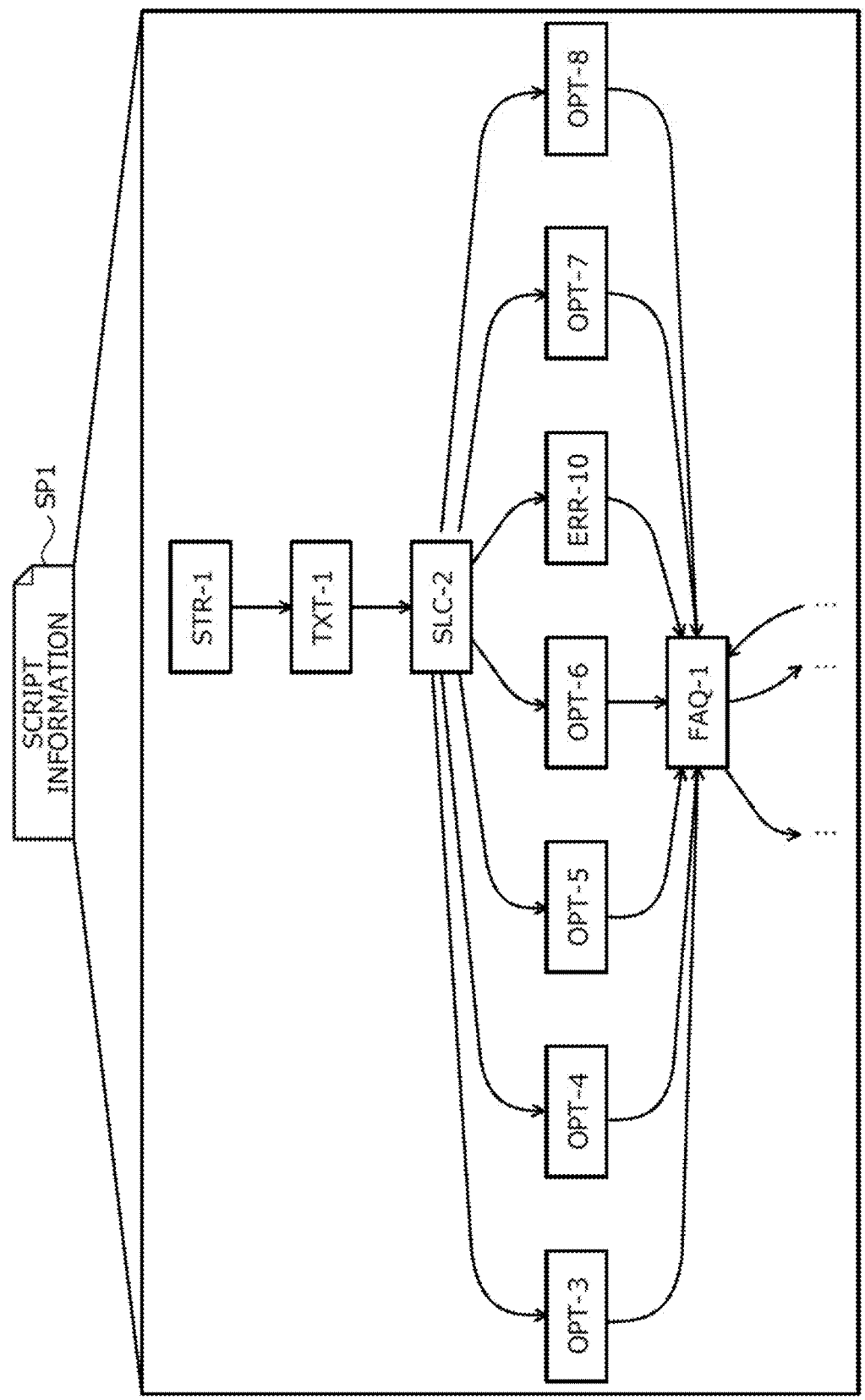
FIG. 6 is a diagram of a specific example of script information.

FIG. 6 is a diagram of a specific example of script information. In FIG. 6, the script information SP1 is information (a scenario) defining a flow of a conversation performed by the chatbot. However, in FIG. 6, a portion of the script information SP1 is excerpted and displayed. In particular, for example, the script information SP1 is information defining the talk process of a chat.

The talk process is a process for realizing operation (behavior) of the chatbot. For example, the talk process includes the process of speaking, the process of displaying options, a process of selecting an option according to a user operation, a process of performing a procedure according to the selected option, a process of ending the talk process, etc.

In the script information SP1, for example, STR-1 indicates the start of the talk process. TXT-1 indicates the process of speaking a message "Hello. I'm a chatbot. What is your question?". SLC-2 indicates the process of displaying options OPT-3 to OPT-8. For example, OPT-3 indicates an option "Regarding family register/certificates". FAQ-1 is a process of searching for and displaying FAQs corresponding to an option. ERR-10 indicates an error process.

Figure 7:
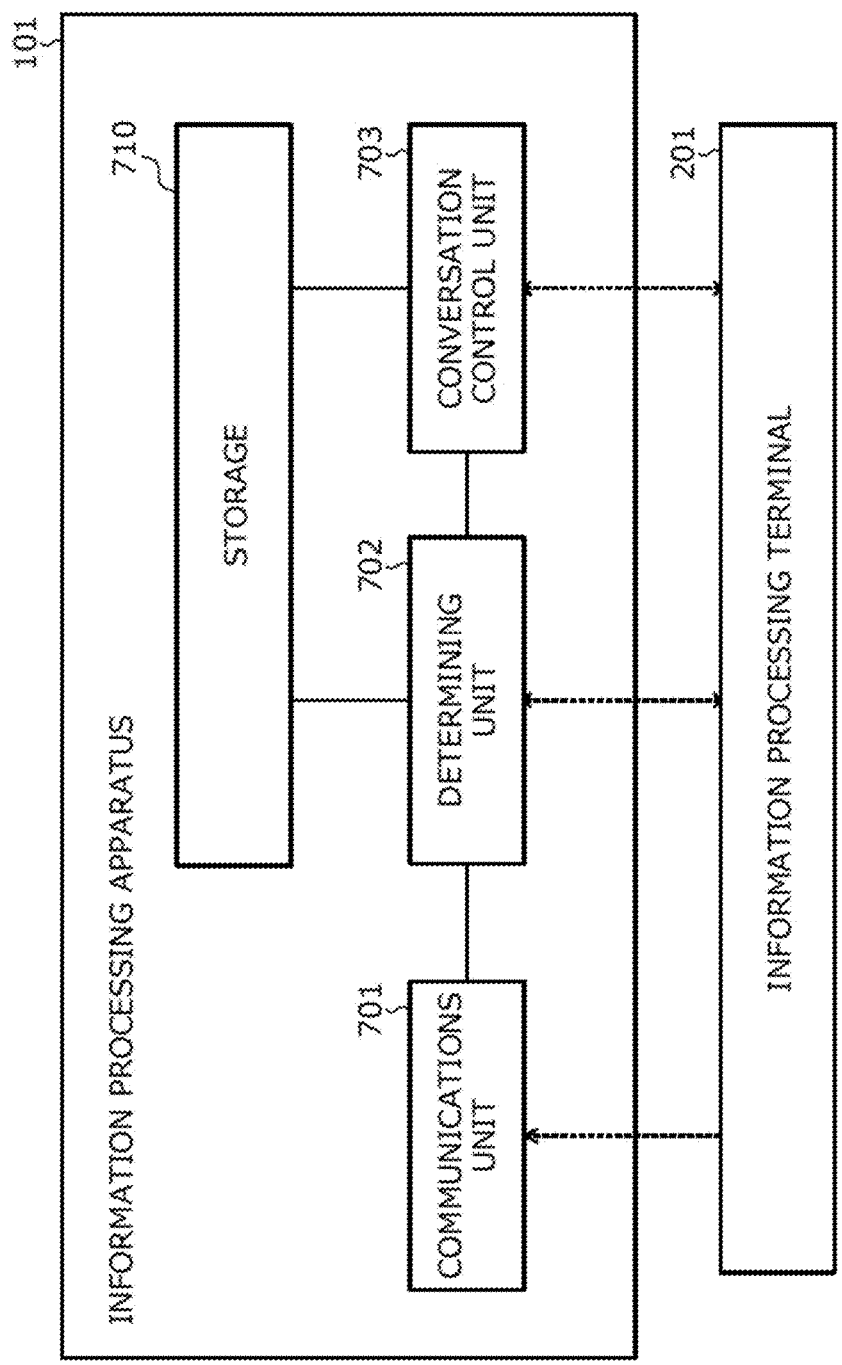
FIG. 7 is a block diagram of an example of a functional configuration of the information processing apparatus 101.

FIG. 7 is a block diagram of an example of a functional configuration of the information processing apparatus 101. In FIG. 7, the information processing apparatus 101 includes a communications unit 701, a determining unit 702, a conversation control unit 703, and a the storage 710. In particular, for example, the communications unit 701 to the conversation control unit 703 are realized by executing a program stored in a storage apparatus such as the memory 302, the disk 304, the portable recording medium 307 depicted in FIG. 3, etc. on the CPU 301 or through the communications I/F 305. Process results of the functional units, for example, are stored to a storage apparatus such as the memory 302, the disk 304, etc. The storage 710, for example, is realized by a storage apparatus such as the memory 302, the disk 304, etc. In particular, for example, the storage 710 stores therein the script table 220 depicted in FIG. 5.

The communications unit 701 receives from an information processing terminal 201 of the information processing terminals 201 used by users, a start instruction for a conversation with the chatbot and attribute information of the user, obtained by the information processing terminal 201. Here, the start instruction for a conversation with the chatbot is for starting a conversation between the user and the chatbot.

The attribute information of the user is information representing a characteristic of the user. For example, the attribute information of the user is information identifying the age group, gender, language, articles worn, presence/ absence of a companion of the user. Further, attribute information of the user may be location information indicating the current location of the user, meteorological information (temperature, humidity, weather, etc.) for the current position of the user.

In particular, for example, the information processing terminal 201 extracts attribute information of the user, when detecting the user by the camera 406 thereof (refer to FIG. 4) or in response to an input operation of the user using the input apparatus 404 (refer to FIG. 4). Subsequently, the information processing terminal 201 transmits a start instruction for a conversation with the chatbot and the extracted attribute information of the user to the information processing apparatus 101.

More specifically, for example, the information processing terminal 201 may analyze image data (for example, video) obtained by the camera 406 thereof to extract attribute information such as the age, gender, articles worn, presence/absence of a companion, etc. of the user. Further, the information processing terminal 201 may analyze sound data obtained by the microphone 408 thereof (refer to FIG. 4) to extract attribute information such as the gender, language, etc. of the user.

Further, the information processing terminal 201 may obtain meteorological information such as the temperature, humidity, weather, etc. by a non-depicted environment sensor or by inquiry to an external server. Further, the information processing terminal 201 may obtain, by a non-depicted GPS unit, location information that indicates the current location. Nonetheless, location information indicating the installation location of the information processing terminal 201 may be stored in advance, when the information processing terminal 201 is a computer installed near a digital board, etc.

As a result, attribute information such as the age group, gender, language, articles worn, presence/absence of a companion, the location, the weather, etc. of the user may be obtained at the information processing terminal 201.

Any existing technique may be used to extract attribute information of the user from image data, sound data, etc. For example, the information processing terminals 201 may extract attribute information such as the age, gender, articles worn, language, presence/absence of a companion, etc. from a feature value an image and/or sound, by a technique based on machine learning such as deep learning.

Nonetheless, the information processing terminal 201, for example, may receive input of the attribute information of the user by an input operation by the user using the input apparatus 404 (refer to FIG. 4). In this instance, the information processing terminal 201 transmits a start instruction for a conversation with the chatbot and the input attribute information of the user to the information processing apparatus 101.

Further, the communications unit 701 may receive, as attribute information of the user, image data obtained by the camera 406 and or sound data obtained by the microphone 408. In this instance, at the information processing apparatus 101, attribute information such as the age group, gender, articles worn, language, etc. may be extracted from the received image data and/or sound data. In other words, configuration may be such that a process of analyzing image data and/or sound data is not performed at the information processing terminals 201.

The determining unit 702 refers to the storage 710 storing therein script information records respectively corresponding to multiple user attributes and determines script information to be applied to the conversation of the chatbot, based on the received attribute information of the user. The script information is information (a scenario) defining a process related to the conversation of the chatbot.

For example, a process of switching the conversation from chatbot-support to human-support in an instance when a specific condition is satisfied based on a conversation history of the chatbot may be described in the script information. Further, a process of changing the options displayed by the information processing terminals 201, based on the conversation history of the chatbot may be described in the script information.

In particular, for example, the determining unit 702, in response to a start instruction for a conversation with the chatbot, identifies user attributes based on the received attribute information of the user. Subsequently, the determining unit 702 refers to the script table 220 and determines script information that corresponds to the identified user attributes to be the script information to be applied to the conversation performed by the chatbot via the information processing terminals 201.

In the description hereinafter, script information to be applied to the conversation performed by the chatbot via the information processing terminals 201 may be referred to as "talk script".

For example, attribute information of the user is assumed to be "age group 'twenties', gender 'female'". In this instance, the determining unit 702 identifies the user attribute "twenties×female" based on the attribute information of the user. Further, the determining unit 702 refers to the script table 220 and determines the script information that corresponds to the identified user attribute "twenties×female" as the talk script.

Further, attribute information of the user is assumed to be "age group 'twenties', gender 'female', companion 'yes (child)'". In this instance, the determining unit 702 identifies user attribute "twenties×female×with child" based on attribute information of the user. Further, the determining unit 702 refers to the script table 220 and determines the script information that corresponds to the identified user attribute "twenties×female×with child" to be the talk script.

Further, the attribute information of the user is assumed to be "age group 'thirties', gender 'male', location information 'Akihabara'". In this instance, the determining unit 702 identifies a user attribute "thirties×male×Akihabara" based on the attribute information of the user. Further, the determining unit 702 refers to the script table 220 and determines the script information that corresponds to the identified user attribute "thirties×male×Akihabara" to be the talk script.

Further, the attribute information of the user is assumed to be "age group 'twenties', gender 'female', meteorological information 'rain'". In this instance, the determining unit 702 identifies a user attribute "twenties×female×rain" based on the attribute information of the user. Further, the determining unit 702 refers to the script table 2200 and determines the script information that corresponds to the identified user attribute "twenties×female×rain" to be the talk script.

Further, the attribute information of the user is assumed to be "age group 'thirties', articles worn 'glasses'". In this instance, the determining unit 702 identifies a user attribute "thirties×glasses" based on the attribute information of the user. Further, the determining unit 702 refers to the script table 2200 and determines the script information that corresponds to the identified user attribute "thirties×glasses" to be the talk script.

In some instances, a script that corresponds to identified user attributes may not be in the script table 220. In these instances, the determining unit 702 may refer to the script table 220 and determine the script information that corresponds to a user attribute "ALL" as the talk script. Further, the determining unit 702 may refer to the script table 220 and determine as the script information that corresponds to at least any one element of the user attributes as the talk script.

For example, it is assumed that no script information that corresponds to the user attribute "twenties×female×rain" is present. In this instance, the determining unit 702 may refer to the script table 220 and determine the script information that corresponds to any of the user attributes "twenties×female", "twenties×rain", and "female×rain" as the talk script.

The conversation control unit 703 uses the determined talk script and starts a conversation performed by the chatbot via the information processing terminals 201. In particular, for example, according to the talk script, the conversation control unit 703, via the chatbot, speaks, displays options, searches for and displays FAQs corresponding to a selected option.

A conversation history (a so-called chatlog) between the user and the chatbot via the information processing terminals 201, for example, is stored to a storage apparatus such as the memory 302, the disk 304, etc. Further, a screen example of a conversation screen displayed by the display 403 of the information processing terminals 201 is described hereinafter using FIGS. 8A and 8B.

Here, a process of switching the conversation from chatbot-support to human-support when a specific condition is satisfied based on the conversation history of the chatbot may be described in the talk script. In this instance, the conversation control unit 703 switches the conversation from chatbot-support to human-support, for example, when a specific condition is satisfied based on the conversation history after the conversation of the chatbot is started according to the talk script.

More specifically, for example, the conversation control unit 703 may judge that a specific condition is satisfied when, based on the conversation history, a specific keyword has been input. The specific keyword may be arbitrarily set. For example, the specific keyword may be "Send out the person in charge", "Send out your supervisor", etc. or may be a business keyword such as "luxurious French dining", "resort", etc. The specific keyword, for example, is input in conversation screens like conversation screens 810, 820 depicted in FIGS. 8A and 8B described hereinafter.

Further, the conversation control unit 703, for example, may judge that a specific condition is satisfied when a specific option is selected multiple times. A specific option, for example, is an option that is selected such as "Not among these", "No", etc., when desired information is not obtained. Further, the conversation control unit 703, when determining that a specific condition is satisfied, connects the information processing terminal 201 and the operator terminal 202, and switches the conversation from chatbot-support to human-support by an operator. A specific option, for example, is selected in conversation screens like the conversation screens 810, 820 depicted in FIGS. 8A and 8B described hereinafter.

Further, a process of changing the options displayed by the information processing terminals 201 based on the conversation history of the chatbot may be described in the talk script. In this instance, according to the talk script, the conversation control unit 703, for example, changes the displayed options based on the conversation history after the conversation of the chatbot starts.

In particular, for example, in the process of displaying specific options, the conversation control unit 703 causes the chatbot to display a predetermined question text before displaying the specific options and according to the answer to the predetermined question text, changes the options to be displayed. A specific option is an option that is unsuitable due to, for example, the age of the user.

An example of changing the options displayed by the information processing terminals 201 is described hereinafter using FIG. 10.

In the description above, while the talk script is determined based on the attribute information of the user received from the information processing terminals 201, configuration is not limited hereto.

For example, in an instance in which the information processing terminals 201 are smartphones and/or tablet PCs of individuals, the use of image data obtained by the camera 406 and/or sound data obtained by the microphone 408 without permission is undesirable. Further, use of the camera 406 and/or the microphone 408 by the information processing terminals 201 may be impossible or the information processing terminals 201 may not have the camera 406 and/or the microphone 408.

In other words, when the information processing terminals 201 are smartphones and/or tablet PCs of individuals, there may be instances in which information necessary for automated determination of the talk script cannot be obtained.

Thus, the determining unit 702 may be configured to obtain type information of the information processing terminals 201. Here, type information of the information processing terminals 201 is information for judging whether an information processing terminal 201 is a specified information processing terminal. A specified information processing terminal, for example, is an information processing terminal such as a digital board installed in a public place. Nonetheless, even in an instance of an information processing terminal of an individual, when permission to use attribute information of the user is obtained, the information processing terminal may be treated as a specified information processing terminal.

The type information of the information processing terminals 201, for example, is included in the start instruction for a conversation with the chatbot, from the information processing terminals 201. In this instance, the determining unit 702 obtains the type information of the information processing terminal 201 included in the start instruction for a conversation with the chatbot. Further, the determining unit 702 may obtain the type information by receiving the type information from the information processing terminals 201, separately from the start instruction for a conversation with the chatbot.

Further, in an instance in which the type information of the information processing terminal 201 corresponds to that of a specified information processing terminal, the determining unit 702 refers to the storage 710 and determines the talk script based on attribute information of the user. In this instance, the conversation control unit 703 uses the determined talk script and starts a conversation performed by the chatbot via the information processing terminal 201.

On the other hand, in an instance in which the type information of the information processing terminal 201 does not correspond to a specified information processing terminal, the determining unit 702 displays, on the information processing terminal 201, information that enables selection of the script information prepared for each of the user attributes. Information that enables selection of script information, for example, may be information that identifies user attributes that correspond to the script information or may be names of the script information.

Subsequently, the determining unit 702 determines the selected script information to be the talk script. In other words, the conversation control unit 703 uses the selected talk script and starts a conversation performed by the chatbot via the information processing terminal 201. An example of the information displayed on the information processing terminals 201 and enabling selection of a script is described hereinafter using FIGS. 9A and 9B.

The functional units of the information processing apparatus 101 may be realized by multiple computers (for example, the information processing apparatus 101 and the information processing terminals 201) in the conversation control system 200.

Figure 8A:
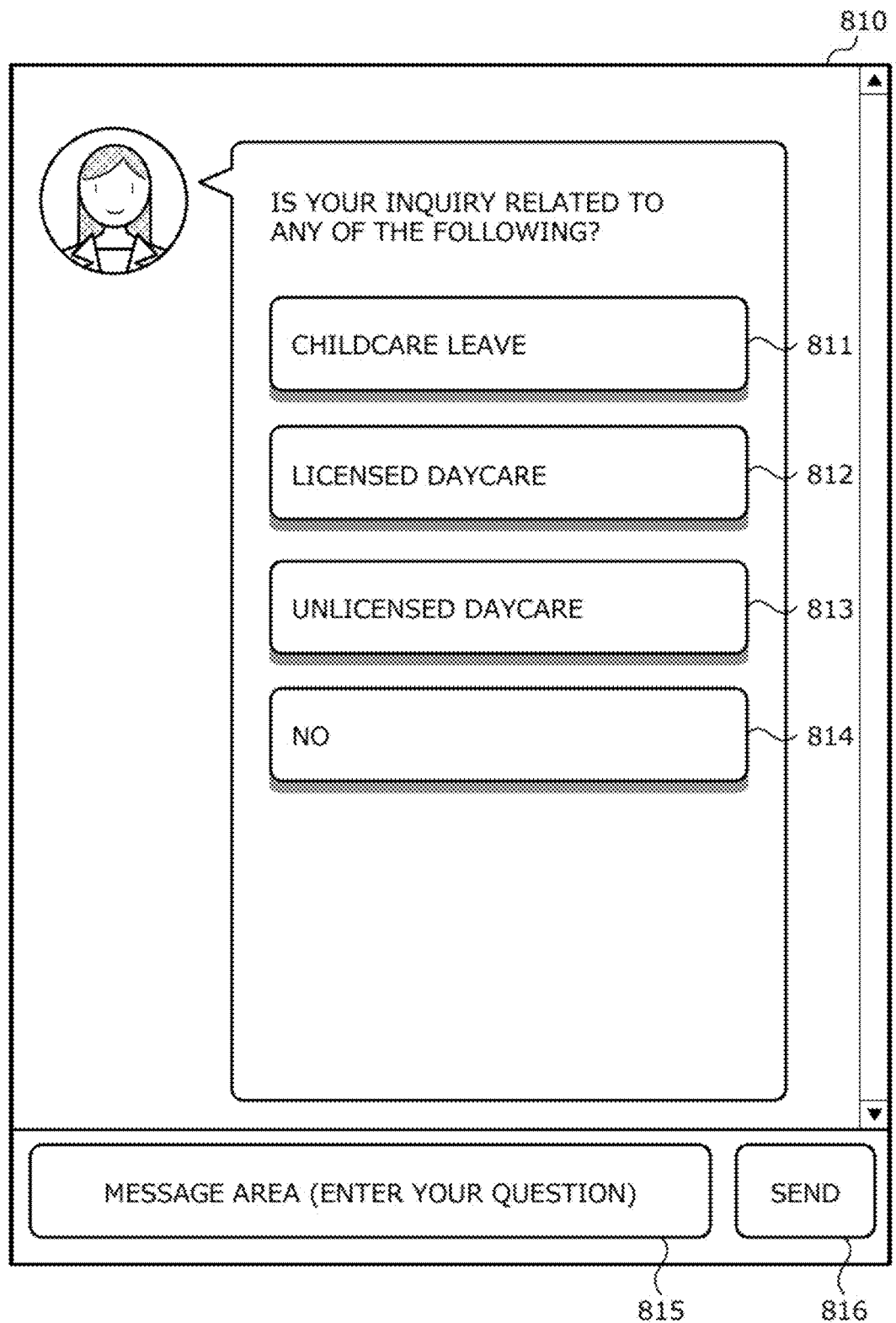
FIG. 8A is a diagram of a screen example of a conversation screen.
Figure 8B:
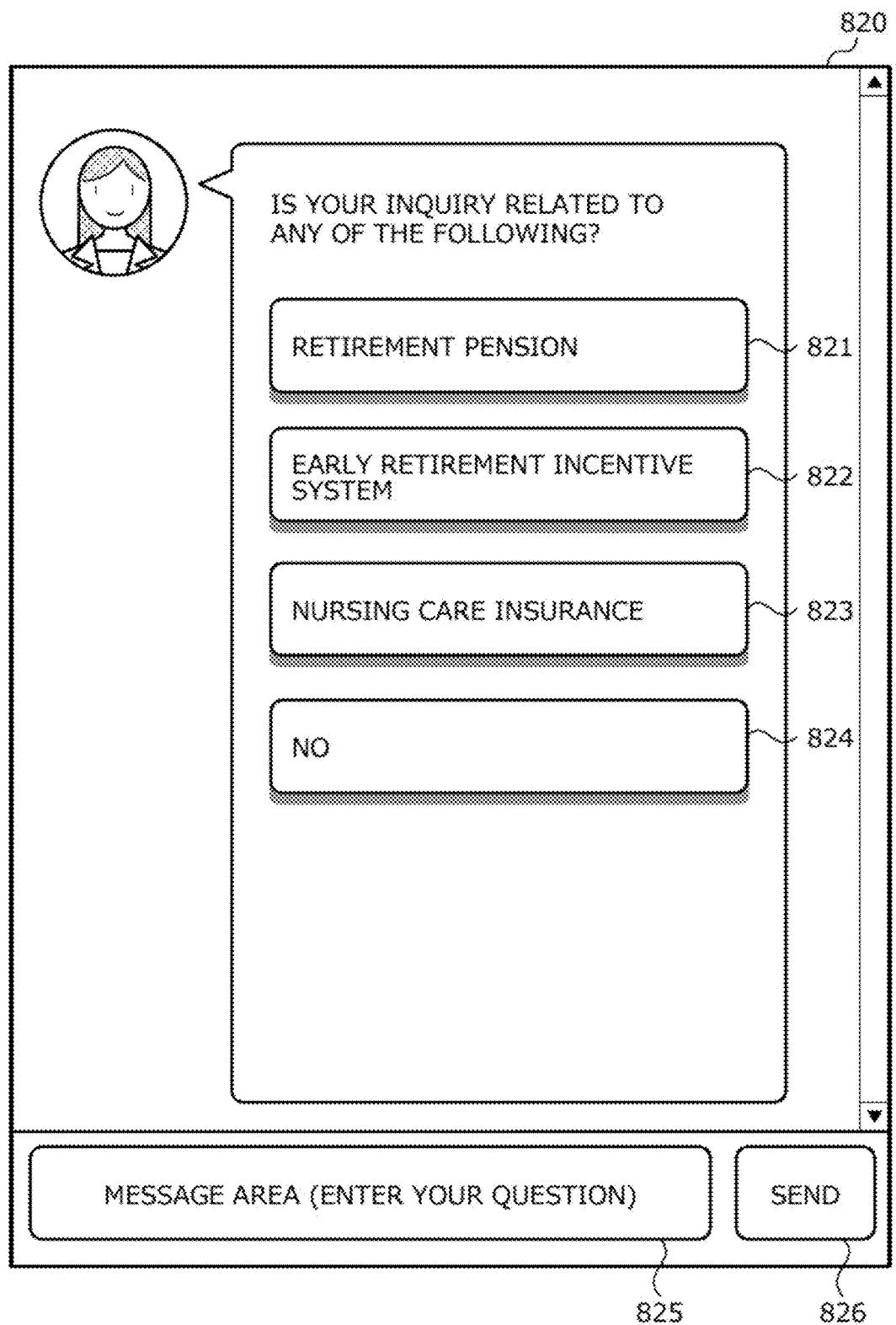
FIG. 8B is a diagram of a screen example of a conversation screen.

Next, a screen example of a conversation screen displayed by the display 403 of the information processing terminals 201 is described using FIGS. 8A and 8B. Here, an instance is assumed in which the information processing terminals 201 are digital boards installed at city hall or a ward office.

FIG. 8A is a diagram of a screen example of a conversation screen. In the example in FIG. 8A, attribute information of the user is assumed to be "age group 'twenties', gender 'female', companion 'yes (child)'". In this instance, a talk script that corresponds to the user attribute "twenties× female×with child" is used and a conversation of the chatbot is started.

In FIG. 8A, the conversation screen 810 is an example of a conversation screen displayed by the display 403 of the information processing terminal 201 when the talk script that corresponds to the user attribute "twenties×female×with child" is used and a conversation of the chatbot is started.

Here, the user, for example, without selecting an option such as "parenting" may converse with the chatbot according to a talk script traced back to FAQs related to parenting and frequently selected by users having similar characteristics to the current user.

For example, in the conversation screen 810, any one of selection buttons 811 to 814 is selected by an input operation by the user using the input apparatus 404, whereby a subsequent conversation may be proceeded to. The selection button 814 is selected when no desired option is among the selection buttons 811 to 813.

Further, in the conversation screen 810, selection of a box 815 enables input of a message and selection of a transmit button 816 enables transmission of the message input to the box 815 to the chatbot (the information processing apparatus 101).

FIG. 8B is a diagram of a screen example of a conversation screen. In the example in FIG. 8B, attribute information of the user is assumed to be "age group 'fifties', gender 'male'". In this instance, a talk script that corresponds to the user attribute "fifties×male" is used and a conversation of the chatbot is started.

In FIG. 8B, the conversation screen 820 is one example of a conversation screen displayed by the display 403 of the information processing terminals 201 when the talk script that corresponds to the user attribute "fifties×male" is used and a conversation of the chatbot is started.

Here, the user, for example, without selecting an option such as "post-retirement" may converse with the chatbot according to a talk script traced back to FAQs related to post-retirement and frequently selected by users having similar characteristics to the current user.

For example, in the conversation screen 820, any one of selection buttons 821 to 824 is selected by an input operation by the user using the input apparatus 404, whereby a subsequent conversation may be proceeded to. The selection button 824 is selected when no desired option is among the selection buttons 821 to 823.

Further, in the conversation screen 820, selection of a box 825 enables input of a message and selection of a transmit button 826 enables transmission of the message input to the box 825 to the chatbot (the information processing apparatus 101).

Figure 9A:
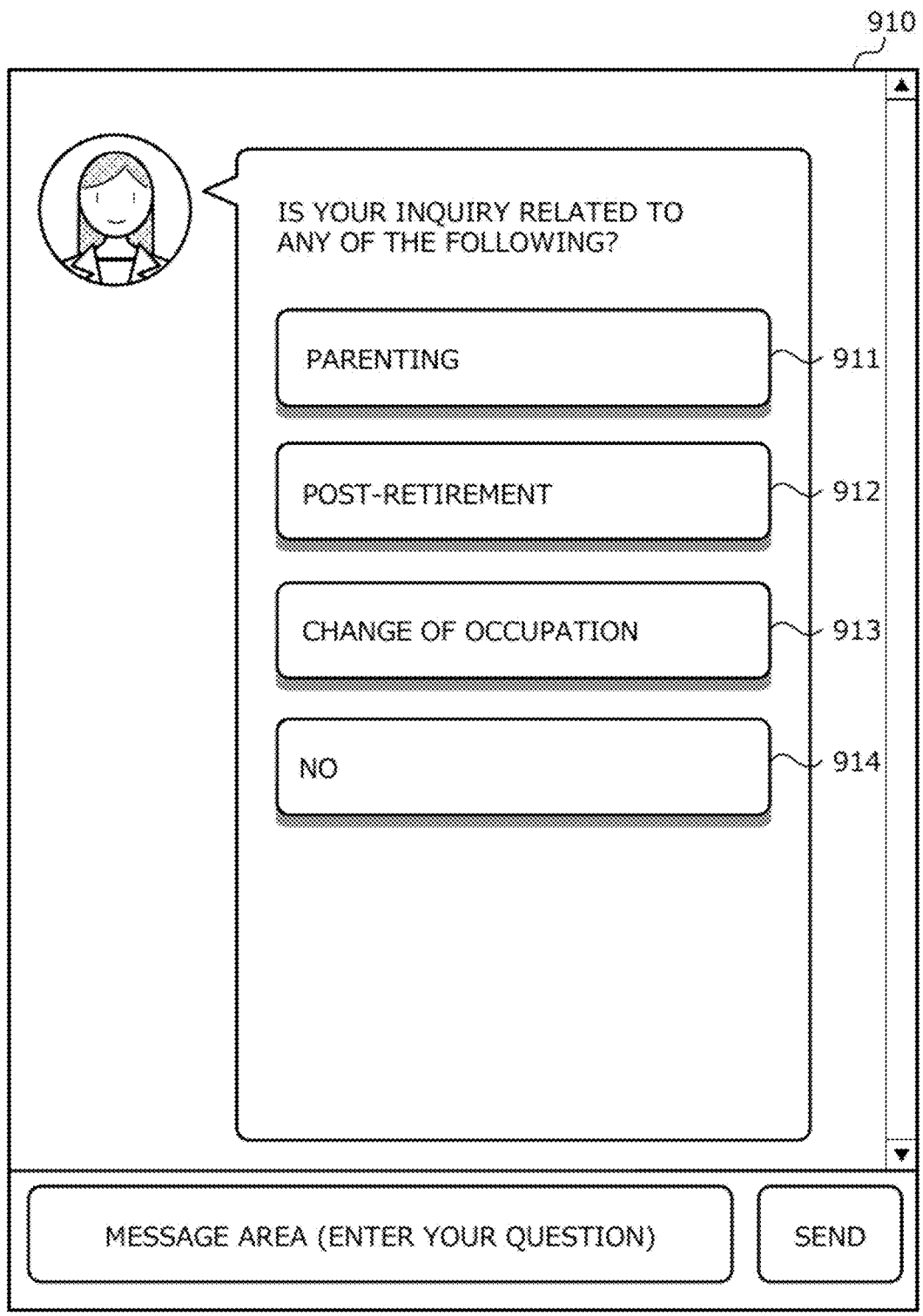
FIG. 9A is a diagram of a screen example of a script selection screen.
Figure 9B:
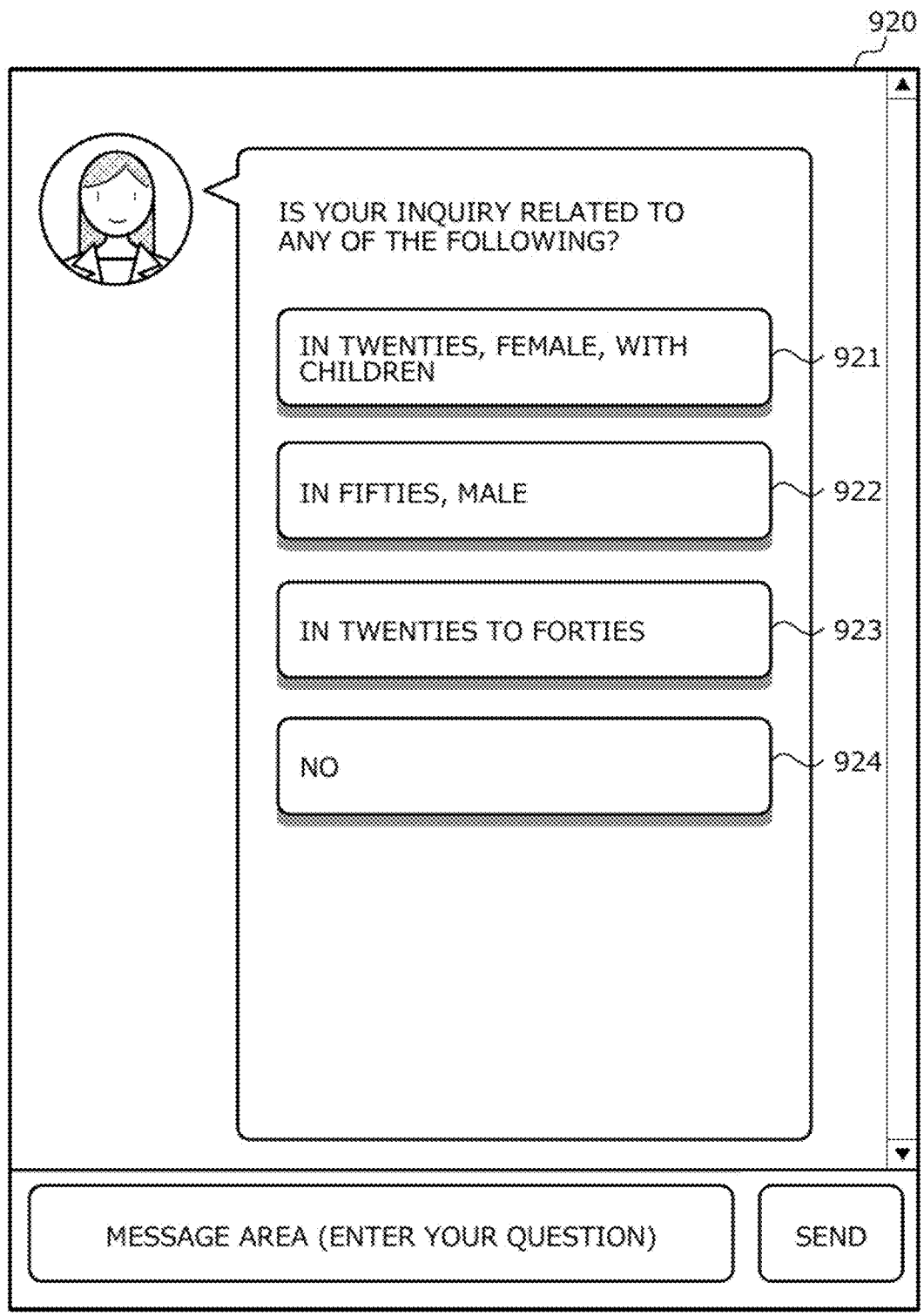
FIG. 9B is a diagram of a screen example of a script selection screen.

Next, a screen example of a script selection screen displayed by the display 403 of the information processing terminals 201 is described using FIGS. 9A and 9B. A script selection screen is an operation screen that enables selection of a script displayed by the display 403 in an instance in which the type information of the information processing terminals 201 does not correspond to a specified information processing terminal.

FIG. 9A is a diagram of a screen example of a script selection screen. In FIG. 9A, a script selection screen 910 is an example of an operation screen for selecting a talk script to be applied to the conversation of the chatbot.

In the script selection screen 910, selection buttons 911 to 913 are displayed that correspond to script names of scripts that respectively correspond to user attributes. In the script selection screen 910, selection of any one of the selection buttons 911 to 913 by an input operation by the user enables selection of a talk script.

For example, when the selection button 911 is selected, a talk script having a script name "parenting" may be selected. The talk script having the script name "parenting" corresponds to script information that corresponds to user attribute "twenties×female×with child".

Further, when the selection button 912 is selected, a talk script having a script name "post-retirement" may be selected. The talk script having the script name "post-retirement" corresponds to script information that corresponds to the user attribute "fifties×male".

Further, when the selection button 913 is selected, a talk script having a script name "change of occupation" may be selected. The talk script having the script name "change of occupation" corresponds to script information that corresponds to user attribute "twenties to forties".

Further, in the script selection screen 910, when the selection button 914 is selected, contents of the selection buttons may be updated and selectable script information may be changed.

FIG. 9B is a diagram of a screen example of a script selection screen. In FIG. 9B, a script selection screen 920 is an example of an operation screen for selecting a talk script to be applied to a conversation of the chatbot.

In the script selection screen 920, selection buttons 921 to 923 that respectively correspond to user attributes are displayed. In the script selection screen 910, selection of any one of the selection buttons 921 to 923 by an input operation by the user enables selection of a talk script.

For example, when the selection button 921 is selected, a talk script that corresponds to user attribute "twenties×female×with child" may be selected. A script that corresponds to the user attribute "twenties×female×with child" corresponds to a talk script having a script name "parenting".

Further, when the selection button 922 is selected, a talk script that corresponds to the user attribute "fifties×male" may be selected. A script that corresponds to the user attribute "fifties×male" corresponds to the talk script having the script name "post-retirement".

Further, when the selection button 923 is selected, a talk script that corresponds to the user attribute "twenties to forties" may be selected. A script that corresponds to the user attribute "twenties to forties" corresponds to the talk script having the script name "change of occupation".

Further, in the script selection screen 920, when the selection button 924 is selected, contents of the selection buttons may be updated and selectable script information may be changed.

Figure 10:
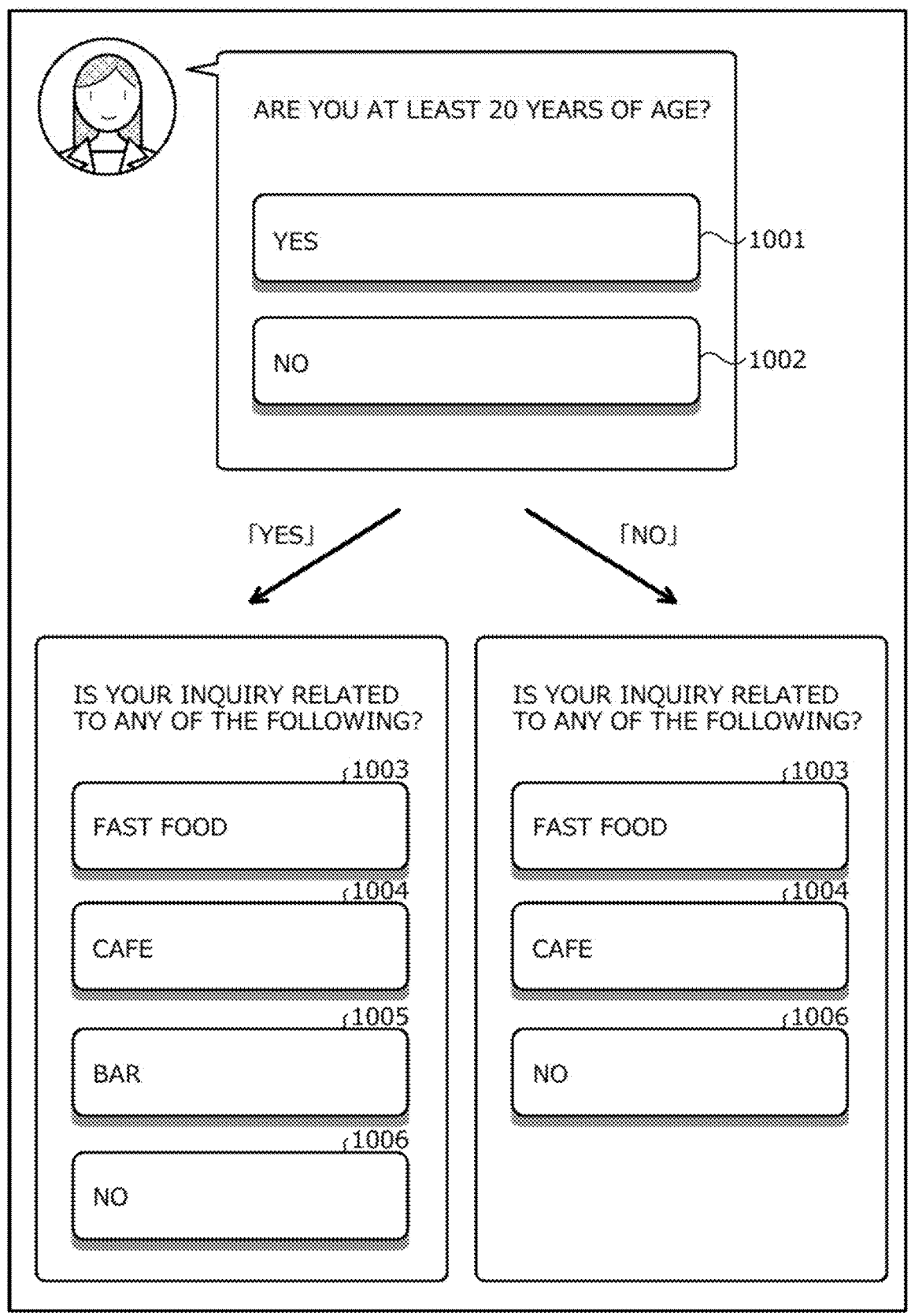
FIG. 10 is a diagram of an example of changing the options.

An example of changing the options displayed by the information processing terminals 201, based on the conversation history of the chatbot is described using FIG. 10. Here, an instance is described in which, at the information processing terminals 201, before a specific option is displayed, the chatbot is caused to display a predetermined question text and the options to be displayed are changed according to the answer to the predetermined question text.

FIG. 10 is a diagram of an example of changing the options. In FIG. 10, a predetermined question text "Are you at least 20 years of age?" is displayed. Here, when a selection button 1001 is selected by an input operation of the user, the conversation control unit 703 causes the information processing terminal 201 to display selection buttons 1003 to 1006. On the other hand, when a selection button 1002 is selected by an input operation of the user, the conversation control unit 703 causes the information processing terminal 201 to display the selection buttons 1003, 1004, 1006.

As a result, the options to be displayed may be changed according to the answer to the predetermined question text "Are you at least 20 years of age?". Here, when the answer is "No", the user is a minor and therefore, the selection button 1005 that corresponds to an option "bar" is not displayed.

A procedure of a conversation control process of the information processing apparatus 101 is described.

FIG. 11 is a flowchart of an example of the procedure of the conversation control process of the information processing apparatus 101. In the flowchart in FIG. 11, first, the information processing apparatus 101 determines whether a start instruction for a conversation with the chatbot and attribute information of the user obtained by the information processing terminal 201 has been received from any one of the information processing terminals 201 (step S1101).

Here, the information processing apparatus 101 waits for reception of a start instruction for a conversation with the chatbot and attribute information of the user (step S1101: NO). Subsequently, when a start instruction for a conversation with the chatbot and attribute information of the user have been received (step S1101: YES), the information processing apparatus 101 identifies the user attributes based on the received attribute information of the user (step S1102).

Next, the information processing apparatus 101 refers to the script table 220 and determines script information that corresponds to the identified user attributes to be a talk script to be applied to a conversation performed by the chatbot via the information processing terminal 201 (step S1103). Subsequently, the information processing apparatus 101 uses the determined talk script and starts the conversation performed by the chatbot via the information processing terminal 201 (step S1104).

Next, the information processing apparatus 101 judges whether a specific condition is satisfied based on a history (a so-called chatlog) of the conversation between the user and the chatbot via the information processing terminal 201 (step S1105). For example, the information processing apparatus 101 judges that a specific condition is satisfied when a specific keyword is input, a specific option is selected multiple times, etc.

Here, when a specific condition is not satisfied (step S1105: NO), the information processing apparatus 101 judges whether to terminate the conversation performed by the chatbot via the information processing terminal 201 (step S1106). The conversation of the chatbot, for example, is terminated according to the talk script or in response to a forced termination operation by the user.

Here, when the conversation of the chatbot is not to be terminated (step S1106: NO), the information processing apparatus 101 returns to step S1105. On the other hand, when the conversation of the chatbot is to be terminated (step S1106: YES), the information processing apparatus 101 terminates a series of operations according to the flowchart.

Further, at step S1105, when a specific condition is satisfied (step S1105: YES), the information processing apparatus 101 connects the information processing terminal 201 and the operator terminal 202, and switches the conversation from chatbot-support to human-support by the operator (step S1107). Subsequently, the information processing apparatus 101 ends a series of operations according to the flowchart.

As a result, the flow of the conversations performed by the chatbot via the information processing terminals 201 may be controlled according to characteristics (for example, age group, gender, language, articles worn, presence/absence of a companion, location information, meteorological information, etc.) of the users using the information processing terminals 201.

The start instruction for a conversation with the chatbot, from the information processing terminals 201 may include the type information of the information processing terminals 201. In this instance, when the type information of an information processing terminal 201 of the information processing terminals 201 corresponds to that of a specified information processing terminal, the information processing apparatus 101 may determine the talk script based on the attribute information of the user, at steps S1102 and 1103. Further, when the type information of the information processing terminal 201 does not correspond to a specified information processing terminal, at steps S1102 and 1103, the information processing apparatus 101 may display, at the information processing terminal 201, information that enables selection of script information prepared for each of multiple user attributes and may determine the selected script information to be the talk script.

As described above, the information processing apparatus 101 according to the embodiment enables reception of a start instruction for a conversation with the chatbot, from the information processing terminals 201 used by users, and reception of attribute information of the user obtained by the information processing terminals 201. Further, the information processing apparatus 101 enables reference of the script table 220 in response to the start instruction for a conversation with the chatbot and starting of a conversation performed by the chatbot via the information processing terminals 201, using the talk script determined based on the received attribute information of the user.

As a result, the flow of the conversations performed by the chatbot via the information processing terminals 201 may be dynamically changed according to characteristics (for example, age group, gender, language, articles worn, presence/absence of a companion, location information, meteorological information, etc.) of the users of the information processing terminals 201. Therefore, the hierarchy of the script until FAQs are traced back may be reduced, the effort necessary for the user to obtain a desired answer (FAQ) is reduced, and withdraw from the chat may be prevented. Withdraw from the chat is prevented, whereby, for example, accessibility of the FAQ system utilizing the chatbot may be increased, resulting in use of shops and services.

Further, the information processing apparatus 101 further enables reception of the type information of the information processing terminals 201 and when the type information of an information processing terminal 201 of the information processing terminals 201 corresponds to that of a specified information processing terminal, enables reference of the script table 220 and determination of the script information based on the attribute information of the user. Further, the information processing apparatus 101 enables display of information that enables selection of script information that corresponds to each of the user attributes, the information being displayed by the information processing terminals 201 when the type information of an information processing terminal 201 of the information processing terminals 201 does not correspond to a specified information processing terminal. Further, the information processing apparatus 101 enables the start of a conversation performed by the chatbot via the information processing terminals 201, using the selected script information.

As a result, in instances in which the information processing terminals 201 are a smartphone of an individual, a device not having the camera 406 and/or the microphone 408, a talk script to be applied to the conversation of the chatbot may be selected by the user. Further, the information processing terminals 201 may automatically determine the talk script in instances in which information that identifies user attributes is sufficiently obtained like with digital boards installed in public places.

Further, according to the information processing apparatus 101, a conversation may be switched from chatbot-support to human-support when a specific condition is satisfied based on the conversation history of the chatbot after the conversation performed by the chatbot via the information processing terminals 201 is started.

As a result, for example, in instances in which the user is unsatisfied with the conversation with the chatbot or when a keyword related to a business opportunity is input, the conversation may be switched from chatbot-support to human-support, thereby enabling suitable measures to be taken.

Further, according to the information processing apparatus 101, the options that are to be displayed by the information processing terminals 201 may be changed based on the conversation history of the chatbot after the conversation performed by the chatbot via the information processing terminal 201 starts.

As a result, according to the conversation history of the chatbot, conversation contents of the chatbot may be changed flexibly so that options not suitable for the user are not displayed. Further, for changing the conversation contents of the chatbot, a process of changing options suffices to be additionally described for the process of displaying options, in the script information and therefore, in terms of development, the load may be reduced as compared to an instance of completely re-writing the script information.

The conversation control method described in the present embodiment may be implemented by executing a prepared program on a computer such as a personal computer and a workstation. This conversation control program is stored on a non-transitory, computer-readable recording medium such as a hard disk, a flexible disk, a CD-ROM, an MO, and a DVD, read out from the computer-readable medium, and executed by the computer. The conversation control program may be distributed through a network such as the Internet.

The information processing apparatus 101 described in the present embodiment can be realized by an application specific integrated circuit (ASIC) such as a standard cell or a structured ASIC, or a programmable logic device (PLD) such as a field-programmable gate array (FPGA).

According to one aspect of the invention, an effect is achieved in that withdraw from a chat may be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-readable recording medium having stored therein a program for causing a computer to execute a process, the process comprising:

receiving, from an information processing terminal used by a user, a start instruction for a conversation with a chatbot and receiving attribute information of the user, obtained by the information processing terminal;

obtaining type information of the information processing terminal;

referring to a storage storing therein, for each user attribute of a plurality of user attributes, script information that corresponds thereto and defines a process related to the conversation of the chatbot, determining, based on the received attribute information of the user, the script information to be used, and using the determined script information to start the conversation performed by the chatbot via the information processing terminal, in response to the start instruction for the conversation with the chatbot, when the obtained type information corresponds to a specified information processing terminal; and displaying, by the information processing terminal, information enabling selection of the script information, when the type information does not correspond to the specified information processing terminal, and using selected script information to start the conversation performed by the chatbot via the information processing terminal.

2. The recording medium according to claim 1, wherein the script information describes therein a process of switching the conversation from chatbot-support to human-support when a specific condition is satisfied based on a conversation history of the chatbot.

3. The recording medium according to claim 1, wherein the script information describes therein a process of changing, based on a conversation history of the chatbot, options that are to be displayed by the information processing terminal.

4. The recording medium according to claim 1, wherein the user attributes are classified according to at least one of age, gender, and language.

5. The recording medium according to claim 1, wherein the user attributes are classified according to presence/absence of a companion.

6. A conversation control method executed by a computer, the method comprising:

receiving, from an information processing terminal used by a user, a start instruction for a conversation with a chatbot and receiving attribute information of the user, obtained by the information processing terminal;

obtaining type information of the information processing terminal;

referring to a storage storing therein, for each user attribute of a plurality of user attributes, script information that defines a process related to the conversation of the chatbot, determining, based on the received attribute information of the user, the script information to be used, and using the determined script information to start the conversation performed by the chatbot via the information processing terminal, in response to the start instruction for the conversation with the chatbot, when the obtained type information corresponds to a specified information processing terminal; and displaying, by the information processing terminal, information enabling selection of the script information, when the type information does not correspond to the specified information processing terminal, and using selected script information to start the conversation performed by the chatbot via the information processing terminal.

7. A conversation control apparatus, comprising:
a memory; and
a processor coupled to the memory, the processor configured to:
receive, from an information processing terminal used by a user, a start instruction for a conversation with a chatbot and receive attribute information of the user, obtained by the information processing terminal;
obtain type information of the information processing terminal;
refer to a storage storing therein, for each user attribute of a plurality of user attributes, script information that defines a process related to the conversation of the chatbot, determine, based on the received attribute information of the user, the script information to be used, and use the determined script information to start the conversation performed by the chatbot via the information processing terminal, in response to the start instruction for the conversation with the chatbot, when the obtained type information corresponds to a specified information processing terminal; and
display, by the information processing terminal, information enabling selection of the script information, when the type information does not correspond to the specified information processing terminal, and use selected script information to start the conversation performed by the chatbot via the information processing terminal.

* * * * *